(12) United States Patent
Hsu et al.

(10) Patent No.: US 12,217,521 B2
(45) Date of Patent: Feb. 4, 2025

(54) METHOD FOR COMPARING CONTENT OF TWO DOCUMENT FILES, AND METHOD FOR TRAINING A GRAPH NEURAL NETWORK STRUCTURE TO IMPLEMENT THE SAME

(71) Applicant: FOXIT SOFTWARE INC., Fremont, CA (US)

(72) Inventors: Po-Fang Hsu, Taichung (TW); Chi-Ching Wei, Taichung (TW)

(73) Assignee: Foxit Software Inc., Fremont, CA (US)

( * ) Notice: Subject to any disclaimer, the term of this patent is extended or adjusted under 35 U.S.C. 154(b) by 518 days.

(21) Appl. No.: 17/567,192

(22) Filed: Jan. 3, 2022

(65) Prior Publication Data
US 2023/0215205 A1 Jul. 6, 2023

(51) Int. Cl.
| | |
|---|---|
| G06V 30/414 | (2022.01) |
| G06F 40/205 | (2020.01) |
| G06F 40/279 | (2020.01) |
| G06N 3/08 | (2023.01) |
| G06V 30/196 | (2022.01) |

(52) U.S. Cl.
CPC ........ G06V 30/1988 (2022.01); G06F 40/205 (2020.01); G06F 40/279 (2020.01); G06N 3/08 (2013.01); G06V 30/414 (2022.01)

(58) Field of Classification Search
CPC ............ G06V 30/1988; G06V 30/414; G06V 10/774; G06V 10/82; G06V 30/418; G06F 40/205; G06F 40/279; G06F 40/194; G06N 3/08; G06N 3/045
USPC ..................................................... 382/219, 19
See application file for complete search history.

(56) References Cited

U.S. PATENT DOCUMENTS

2006/0230100 A1* 10/2006 Shin .................... G06F 16/9577
707/E17.121

* cited by examiner

*Primary Examiner* — Charlotte M Baker
(74) *Attorney, Agent, or Firm* — Hammer & Associates, P.C.

(57) ABSTRACT

A method for comparing content of two document files each having a plurality of content blocks is provided. The method is to be implemented by an electronic device and includes the steps of: performing, for the each of the content blocks in each of the document files, a pre-process operation so as to obtain a plurality of properties associated with the content block; comparing, for each content block from one of the document files, the properties thereof with the properties of each of the plurality of content blocks of the other one of the document files; and generating a comparison result based on the operations of the comparing.

18 Claims, 15 Drawing Sheets

FIG. 4

PDF Source Code Example

PDF Version: 1.4

<</Filter /FlateDecode <</Type /FontDescriptor /FontName
/LiberationSans-Bold /Flags 4/StemV /FontBBox [-184.08203 -
303.22266 1062.01172 1033.20313] /FontFile2 12 0 R>> endobj
14 0 obj <</Type /Font /FontDescriptor 13 0 R /BaseFont
/LiberationSans-Bold /Subtype / 1 0 0 rg
t 0>> </Filter /FlateDecode
/Length 341>> stream
xúJiAnÉOÊ˜¡ÖóÈ"¬»CBH       jã>T"
'ê"c≤†ÖkœÑD"%@g<w<óqXTßJw
?¦ kòXCieanV*¿µ"ASòl‰.t'¦Aæ1AÉji<N–
W¦C,c,r*,,dgò'*'/A˜ayN_ ¥í**07ç¨˜=1‰9S–
Jjoçyoz˜¦ +ir˜›4ØüÊôqù
ÒÄQ7rPòòFÇmÙÇâ*≤˜t+@˜    ;R¦Z˜¨XÃéj6ÁÇÀH)e@38–
ãHïH"AJ¨ç—};
ëð{O=k‰ 9Ù˜nù*_ xð}D*ÿQ›ÖBX>¶ ‡xÖj=KşòÏ$c<¦<%WIsÉ,g
Cl,,cv uüïãÊT3•ò}9fïâ*+Ù˜ ¶jøéi õµnëx{pÇ˜vùÜ«3ÉÓ*¨,É>t
endstream

FIG.5

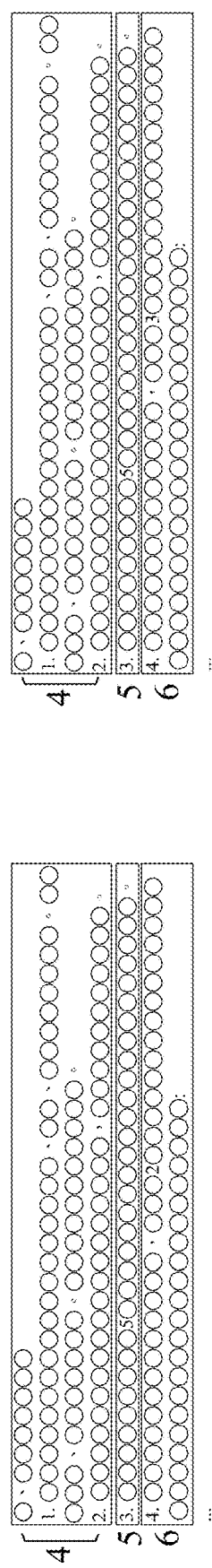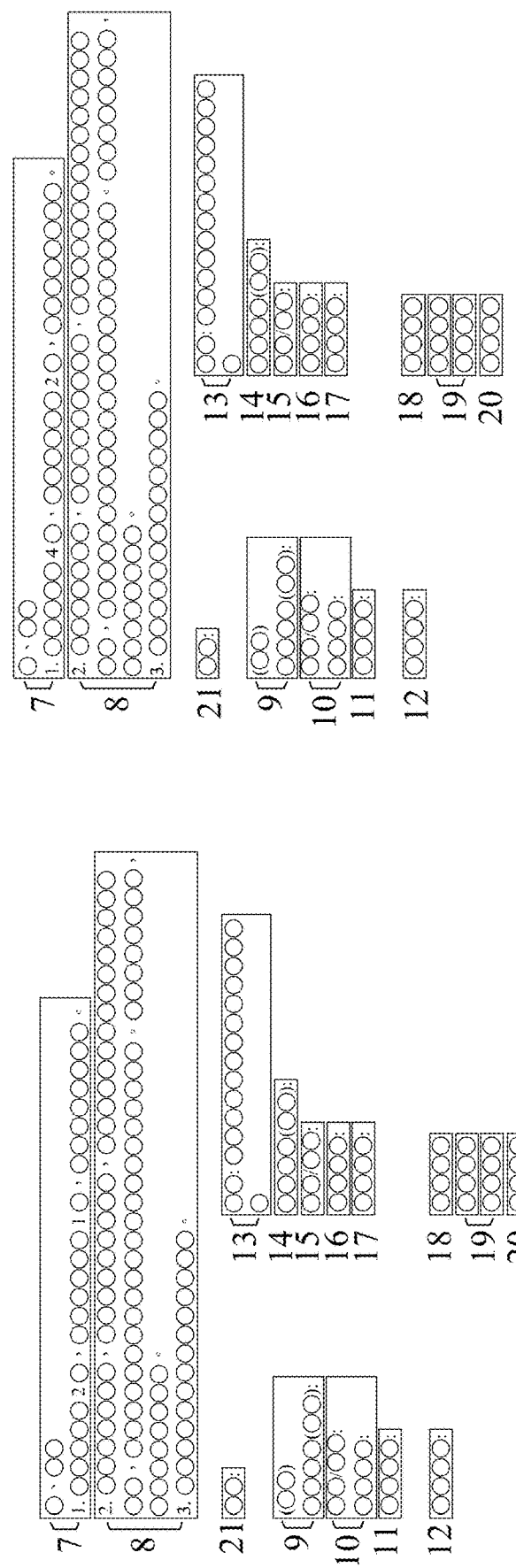
FIG.12

FIG.13

Left column:

A. 18. Discipline. The parties have different disciplinary techniques. The Mother withholds electronics from the child and occasionally ignores the child. Father is stricter in his discipline in an effort to teach his daughter responsibility. Both techniques have their merits but the Court encourages the parties to communicate with one another in an attempt to be consistent in their discipline so that Melia does not manipulate the situation in the future.

B. 19. Mother has made many adjustments to the physical custody schedule at Father's request.

C. 20. Guardian Ad Litem. The Guardian Ad Litem recommended the primary physical custody remain with Mother. The Guardian expressed disappointment at Father's refusing to approve the permissive transfer request without condition, and that she suspected his motive was to enhance his request for modification of custody. The child has expressed three times to the Guardian that she wants to live with Mother in Georgia and wants to spend substantial time with Father.

D. 21. Father is highly involved, has a loving relationship with the child, is responsible and holds the child accountable. Father's has legitimate reasons for relocating to North Carolina in that it offers a better employment opportunity in North Carolina financially that will benefit Father's entire family including Melia. Father's concerns about completely relocating to North Carolina are out of concern for how it would affect his rights to the child.

22. The father has always been a highly participatory father in every aspect of Media daily life. He has taught Melia responsibility through love and discipline in an effort to make sure that Media grows up to be a responsible young woman. Father is a hands on father in every aspect of Melia's life. Father's motive for seeking custody is directly rooted in his desire to give Media the foundation to be a successful and responsible adult.

E. 23. The child is not only loved by her parents but by her extended family. The child has many friends and ling-term attachments in her Gwinnett County home area. The child is also very close to her half-sister, Zoe, who lives in North Carolina.

Right column:

A. 18. Discipline. To enforce good behavior, Mother withholds electronics from the child and occasionally ignores the child. Father admitted to using pinching as punishment of the child. When the child stole candy from her teacher, Father, over Mother's objection, withheld the child from participating in a team gymnastics meet, which caused her team to lose points. He required the child to watch her team and tell the team why she could not participate. Mother wanted to limit the discipline to school-related activities.

19. Mother has made many adjustments to the physical custody schedule at Father's request.

B. 20. Guardian Ad Litem. The Guardian Ad Litem recommended the primary physical custody remain with Mother. The Guardian expressed disappointment at Father's refusing to approve the permissive transfer request without condition, and that she suspected his motive was to enhance his request for modification of custody. The child has expressed three times to the Guardian that she wants to live with Mother in Georgia and wants time with Father.

C. 21. Father is highly involved, has a loving relationship with the child, is responsible and holds the child accountable. Father is strict and sees things as either black or white. However, at times he has to be more flexible. Father has a better employment opportunity in North Carolina financially. Father's concerns about completely relocating to North Carolina are out of concern for how it would affect his rights to the child.

D. 22. The child is not only loved by her parents but by her extended family locally. The child has many friends and ling-term attachments in her Gwinnett County home area.

E. 23. The court lines many positive observations of both parents and has very few negative ones. However, both parents lack the skills to have productive communications with each other. Father is extremely precise concerning time and data and other items and has an extreme interpretation of joint legal custody. Mother needs to recognize that Father is who he is and not try to communicate to push him. Mother's request for Father's assistance in certain matters is not a weakness. Father should not view such requests as fodder for future litigation. Both...

METHOD FOR COMPARING CONTENT OF TWO DOCUMENT FILES, AND METHOD FOR TRAINING A GRAPH NEURAL NETWORK STRUCTURE TO IMPLEMENT THE SAME

FIELD

The disclosure relates to a method for comparing contents of two document files, and a method for training a graph neural network (GNN) structure for comparing contents of two document files.

BACKGROUND

Contents of electronic document files are typically subjected to many revisions and therefore may have a plurality of versions, each being different from others. In some cases the revisions may be substantial, while in some cases they may be minor. Regardless of which case it may be, determining difference among different electronic document files may be important for subsequent analysis of the document files.

In the field of document comparison between two documents, it may be beneficial to identify a number of components of each of the document files, and obtain a correspondence between the components of one of the documents and the components of the other one of the documents. Each component may be a paragraph, a figure, a table, or other contents that can be included in a block.

FIG. 1 illustrates two exemplary document pages that may be two different versions of a same document, and each of the two document pages has a plurality of components 10. It is noted that while the contents of the two document pages are substantially the same, arrangement of the components 10 on a right one of the two document pages are noticeably different from that on a left one of the two document pages. In such cases, obtaining the correspondence between the components 10 of one of the documents and the components 10 of the other one of the documents may be difficult.

SUMMARY

Therefore, an object of the disclosure is to provide a method for comparing contents of two document files.

According to one embodiment of the disclosure, the A method for comparing content of two document files each having a plurality of content blocks; the method to be implemented by an electronic device and comprising the steps of:
- performing, for each of the content blocks in each of the document files, a pre-process operation so as to obtain a plurality of properties associated with the content block;
- comparing, for each content block from one of the document files, the properties of the content block with the properties of each of the plurality of content blocks of the other one of the document files; and
- generating a comparison result based on the operations of comparing.

Another object of the disclosure is to provide a method for training a GNN structure that is capable of performing operations in the method for comparing contents of two document files.

According to one embodiment of the disclosure, the method includes:
- constructing an initial GNN structure that includes a plurality of layers;
- preparing a plurality of training datasets, each of the training datasets including two source files, each of the source files including a plurality of content blocks;
- supplying the plurality of training datasets into the initial GNN structure as input, so as to train the initial GNN structure to obtain a trained GNN structure that is configured to compare, for each content block from one of the document files, properties of the content block with the properties of each of a plurality of content blocks of the other one of the document files.

BRIEF DESCRIPTION OF THE DRAWINGS

Other features and advantages of the disclosure will become apparent in the following detailed description of the embodiments with reference to the accompanying drawings, of which:

FIG. 4 illustrates one page of an exemplary document file, with a plurality of content blocks identified;

FIG. 5 illustrates a set of source code contained in a portable document format (PDF) file;

FIGS. 12 and 13 are exemplary visual representations of a comparison result of the two document files;

DETAILED DESCRIPTION

Figure 1:
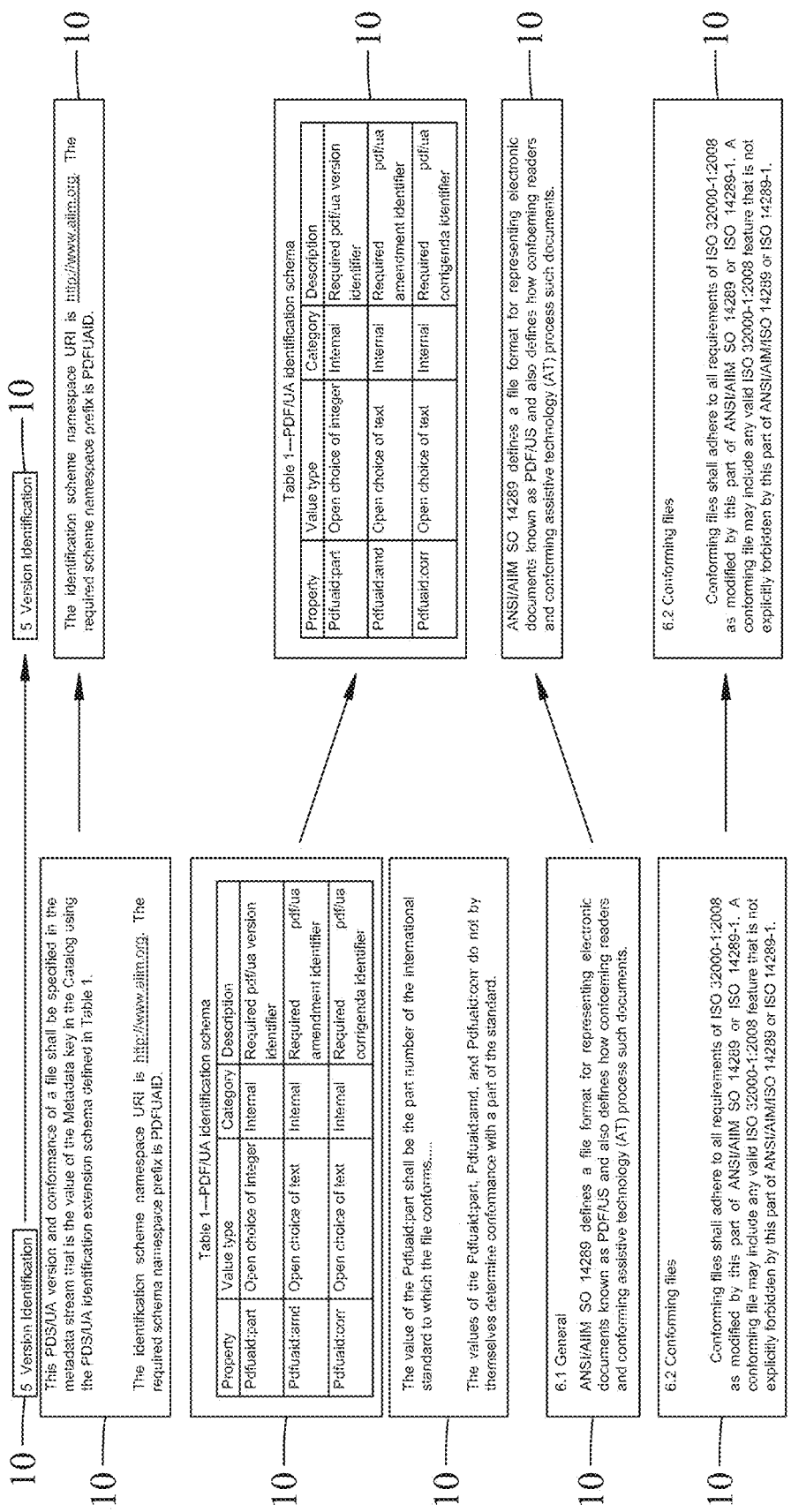
FIG. 1 illustrates two exemplary document pages that are two different versions of a same document.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" may refer to a direct connection among a plurality of electrical apparatus/devices/equipments via an electrically conductive material (e.g., an electrical wire), or an indirect connection between two electrical apparatus/devices/equipments via another one or more apparatus/devices/equipment, or wireless communication.

Figure 2:
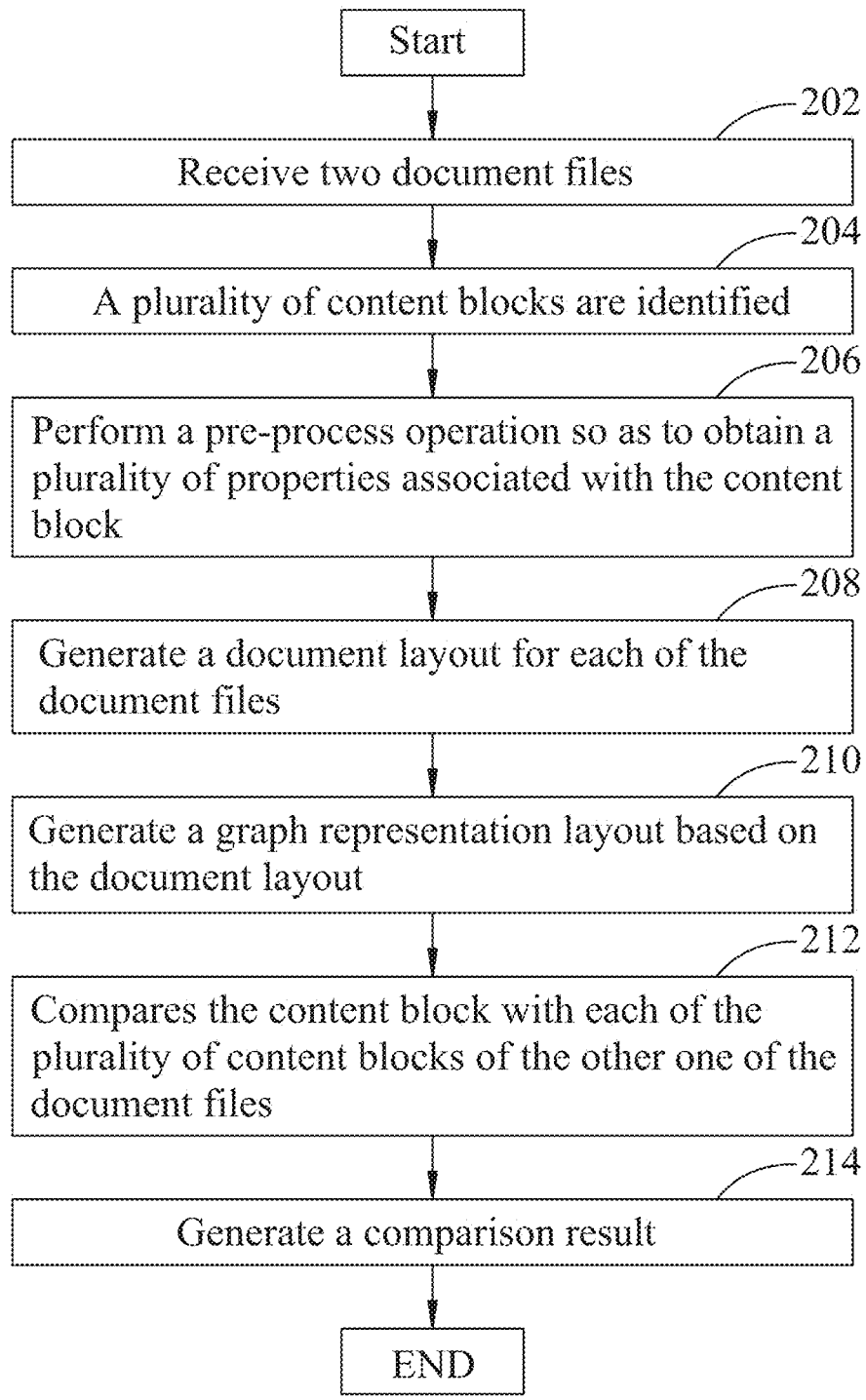
FIG. 2 is a flow chart illustrating steps of a method for comparing content of two document files according to one embodiment of the disclosure.

FIG. 2 is a flow chart illustrating steps of a method 200 for comparing content of two document files according to one embodiment of the disclosure. In this embodiment, the method 200 is implemented using an electronic device 300 as shown in FIG. 3.

Figure 3:
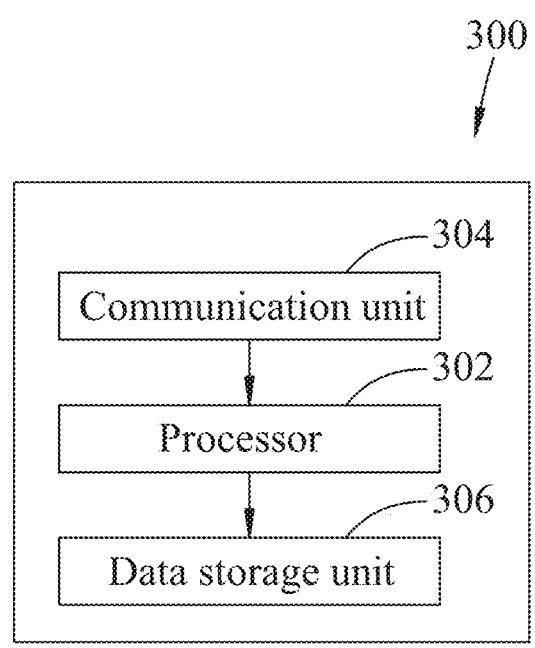
FIG. 3 is a block diagram of an exemplary electronic device according to one embodiment of the disclosure.

FIG. 3 is a block diagram of an exemplary electronic device 300 for implementing the method 200 of FIG. 2 according to one embodiment of the disclosure. The electronic device 300 may be embodied using a personal computer, a laptop, a tablet, a smartphone, or other kinds of devices with similar functions. In this embodiment, the electronic device 300 includes a processor 302, a communication unit 304 and a storage medium 306.

The processor 302 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The communication unit 304 may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G) and/or fifth generation (5G) of wireless mobile telecommunications technology, and/or the like. In use, the electronic device 100 may be controlled to communicate with another electronic device via the communication unit 304.

The storage medium 306 may be embodied using one or more of a hard disk, a solid-state drive (SSD) and other non-transitory storage medium, and stores a software application and a graph neural network (GNN) therein.

In use, the software application includes instructions that, when executed by the processor 302, cause the processor 302 to perform a number of operations as described below.

In step 202, the processor 302 receives two document files. The document files may be in a form of portable document format (PDF), but is not limited to such. The document files may be received from an external source such as a website or a cloud storage that can be accessed by the electronic device 300 through the communication unit 304, or may be pre-stored in the storage medium 306.

In step 204, for each of the document files, a plurality of content blocks are identified, and then the processor 302 obtains the identified content blocks for each of the document files. Specifically, a content block may include a title, one or more sentences, one paragraph, one figure, one table, or other content included in the document file. In the cases that the document file includes a plurality of pages, a single content block may cross multiple pages.

Figure 4:
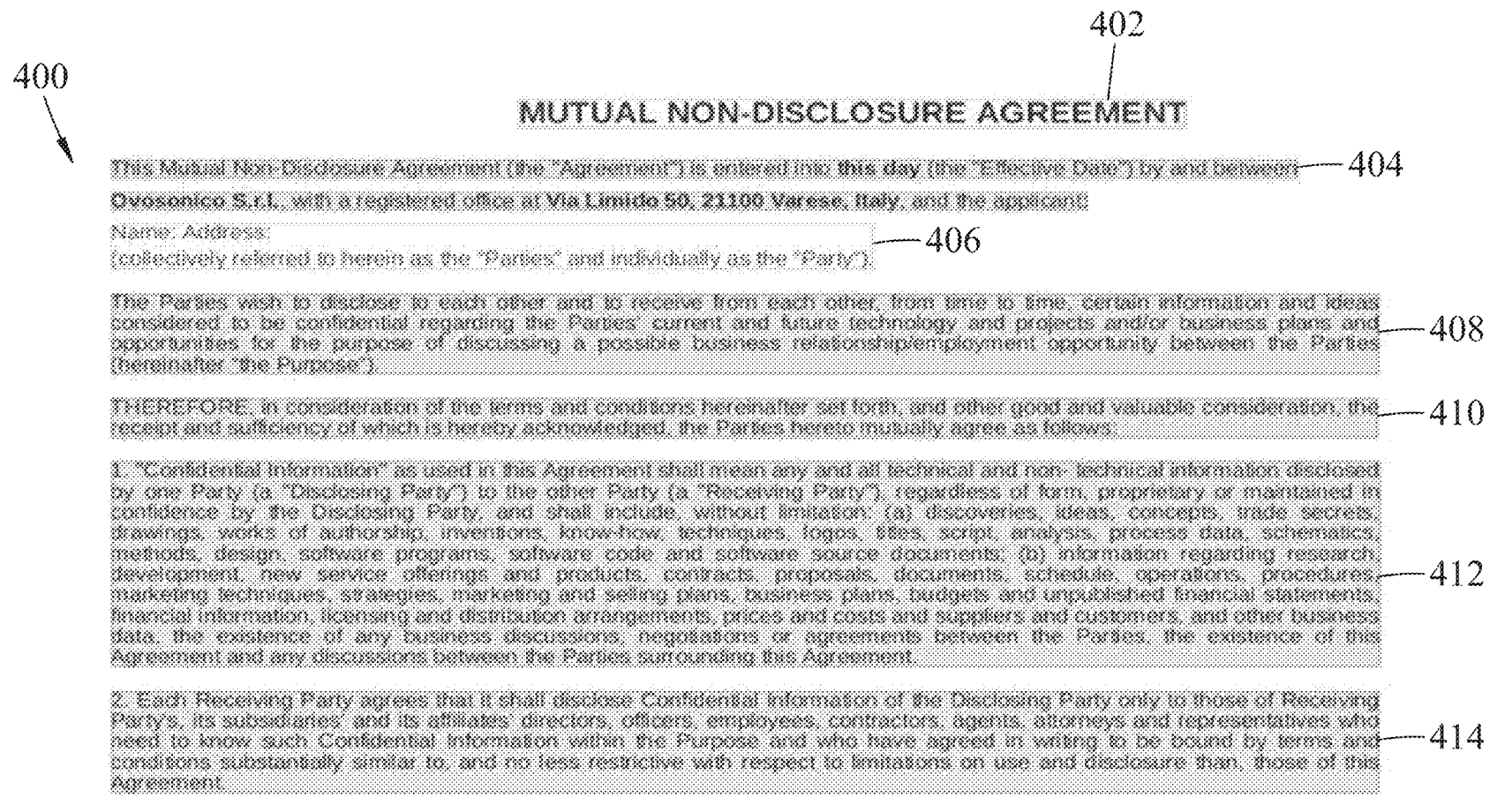

It is noted that the identification of the content blocks may be implemented by the processor 302 executing a pre-stored algorithm, or may be manually implemented by a user, FIG. 4 illustrates one page 400 of an exemplary document file, with the content blocks (labeled 402, 404, 406, 408, 410, 412 and 414) identified. In different embodiments, the pre-stored algorithm may be described in the following documents: K. Chen, F. Yin, and C. Liu, "Hybrid Page Segmentation with Efficient Whitespace Rectangles Extraction and Grouping," 2013 12$^{th}$ International Conference on Document Analysis and Recognition (ICDAR), 2013, pp. 958-962;

T. A. Tran, K. Oh, I. Na, G. Lee, H. Yang, and S. Kim, "A Robust System for Document Layout Analysis using Multilevel Homogeneity Structure," *Expert Systems with Applications*, vol. 85, 2017, pp. 99-113; and Y. Xu, M. Li, L. Cui, S. Huang, F. Wei, and M. Zhou, "LayoutLM: Pre-training of Text and Layout for Document Image Understanding," *Proceedings of the to 26$^{th}$ ACM SIGKDD International Conference on Knowledge Discovery & Data Mining*, 2020, pp. 1192-1200.

In step 206, the processor 302 is configured to, for each of the content blocks in each of the document files, perform a pre-process operation so as to obtain a plurality of properties associated with the content block.

For each of the content blocks, the plurality of properties associated therewith include a text property indicating text content included in the content block, a geometric property indicating a location of the content block in the document file, and a visual property indicating a visual style of the text content included in the content block. In embodiments, the plurality of properties may be obtained from the texts of the document files. In the cases that the document files are in PDF (i.e., PDF files), the plurality of properties may be obtained from source code extracted from the document files.

Taking the page 400 shown in FIG. 4 as an example, the content block 402 includes the text content of "MUTUAL NON-DISCLOSURE AGREEMENT", which may be expressed in one of a number of forms. For example, the text content may be encoded using one-hot encoding into the text property in a form of a binary code (i.e., a one hot), and then the text property can form a vector (e.g., a one-hot vector), In other embodiments, other word embedding algorithm may be employed to convert the text content into a vector.

The geometric property of the content block 402 may include the information of a center point of the content block 402 (which may be expressed as a set of coordinates (x, y)), a width of the content block 402, a height of the content block 402, etc.

The visual property of the content block 402 may include information about characters in the text content, such as a font style of the characters, a size of the characters, a color of the characters, etc. The information may be combined and encoded using one-hot encoding or other forms of word embedding, so as to form a vector that indicates the visual property.

In this embodiment, since the document files are PDF files, the information that constitutes the visual property of a document file may be obtained from a set of source codes (also known as PDF source code) contained in the document file (as shown in FIG. 5).

Other properties may also be expressed in the form as described above. An example of one-hot encoding for expressing the text property is illustrated in the following Table 1. In this example, the text content has at least the words "parties", "disclose" and "to" and does not have the word "wish", and accordingly, the text property is "11 . . . 01" and the vector is [11 . . . 01].

TABLE 1

| Text Encode | |
|---|---|
| Parties | 1 |
| Disclose | 1 |
| . . . | . . . |

TABLE 1-continued

| Text Encode | |
|---|---|
| Wish | 0 |
| to | 1 |

An example of one-hot encoding for expressing the geometric property is provided in the following Table 2.

TABLE 2

| Bounding Box (Bbox) | |
|---|---|
| Class | Paragraph |
| X0 | 184.30 |
| Y0 | 1033.20 |
| X1 | 303.22 |
| Y1 | 3062.01 |
| w | 118.92 |
| h | 28.81 |

An example of one-hot encoding for expressing the visual property is illustrated in the following Table 3.

TABLE 3

| Font Name | |
|---|---|
| Liberation | 1 |
| Size | 12 |
| Bold | 1 |
| Color | xx |
| . . . | . . . |

Figure 6:
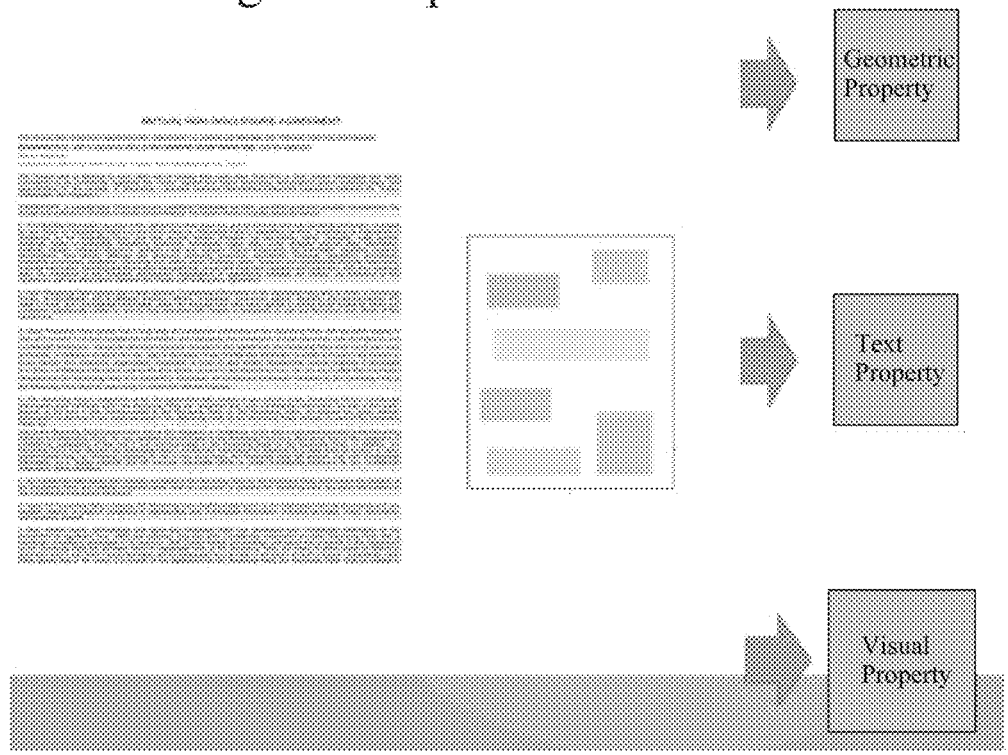
FIG. 6 illustrates an exemplary manner for encoding a number of properties of multiple content blocks.

FIG. 6 illustrates an exemplary manner for encoding the above properties. Specifically, each of the properties may be expressed by a table for subsequent processing or utilization.

It is noted that in some embodiments, a category property may also be obtained for each of the content blocks. The category property indicates a category of the specific content block, such as a title, a header, a chapter mark, an index of paragraph, etc.

After the pre-process operation has completed for the two document files, the processor 302 generates a document layout for each of the document files in step 208.

Figure 7:
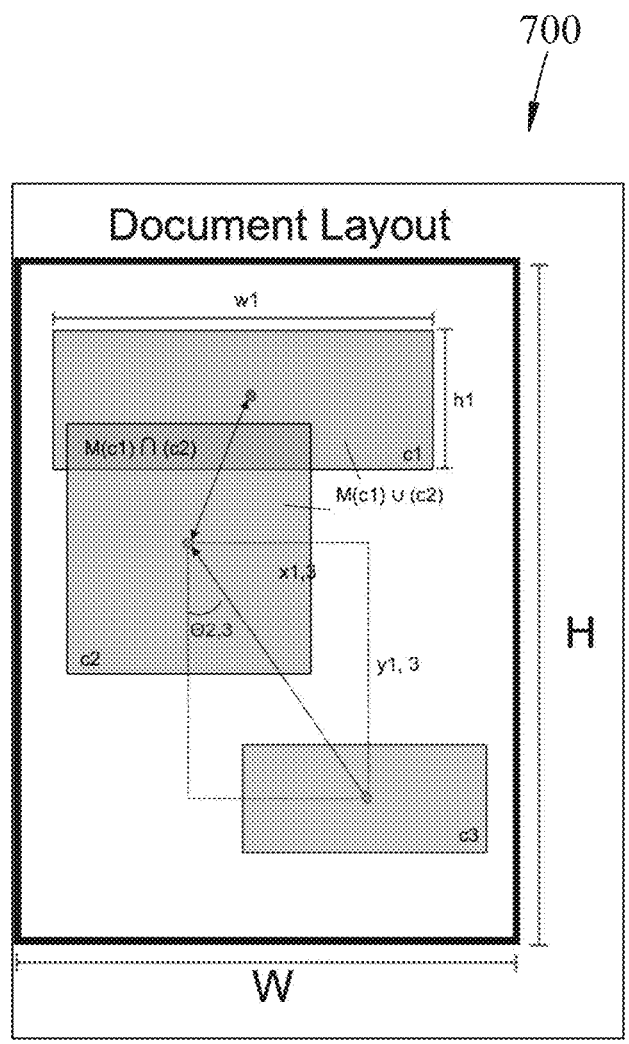
FIG. 7 is an exemplary document layout that corresponds with one page of one document file.

FIG. 7 is an exemplary document layout 700 that corresponds with one document file having one page. In this example, the page has a height of "h" and a width of "w". The document layout 700 includes a plurality of layout blocks (labeled $c_1$ to $c_3$) each indicating a content block, and a plurality of layout associations (line between the layout blocks, and labeled such as $x_{0,1}$) each indicating a relationship between two layout blocks.

In this example, the page includes three content blocks, and the document layout 700 includes three layout blocks $c_1$ to $c_3$, and a number of layout associations among the layout blocks $c_1$ to $c_3$. Each of the layout blocks $c_1$ to $c_3$ contains the above-mentioned properties of the corresponding one of the content blocks, and is located to correspond with the location of the corresponding one of the content blocks in the document file.

Figure 11:
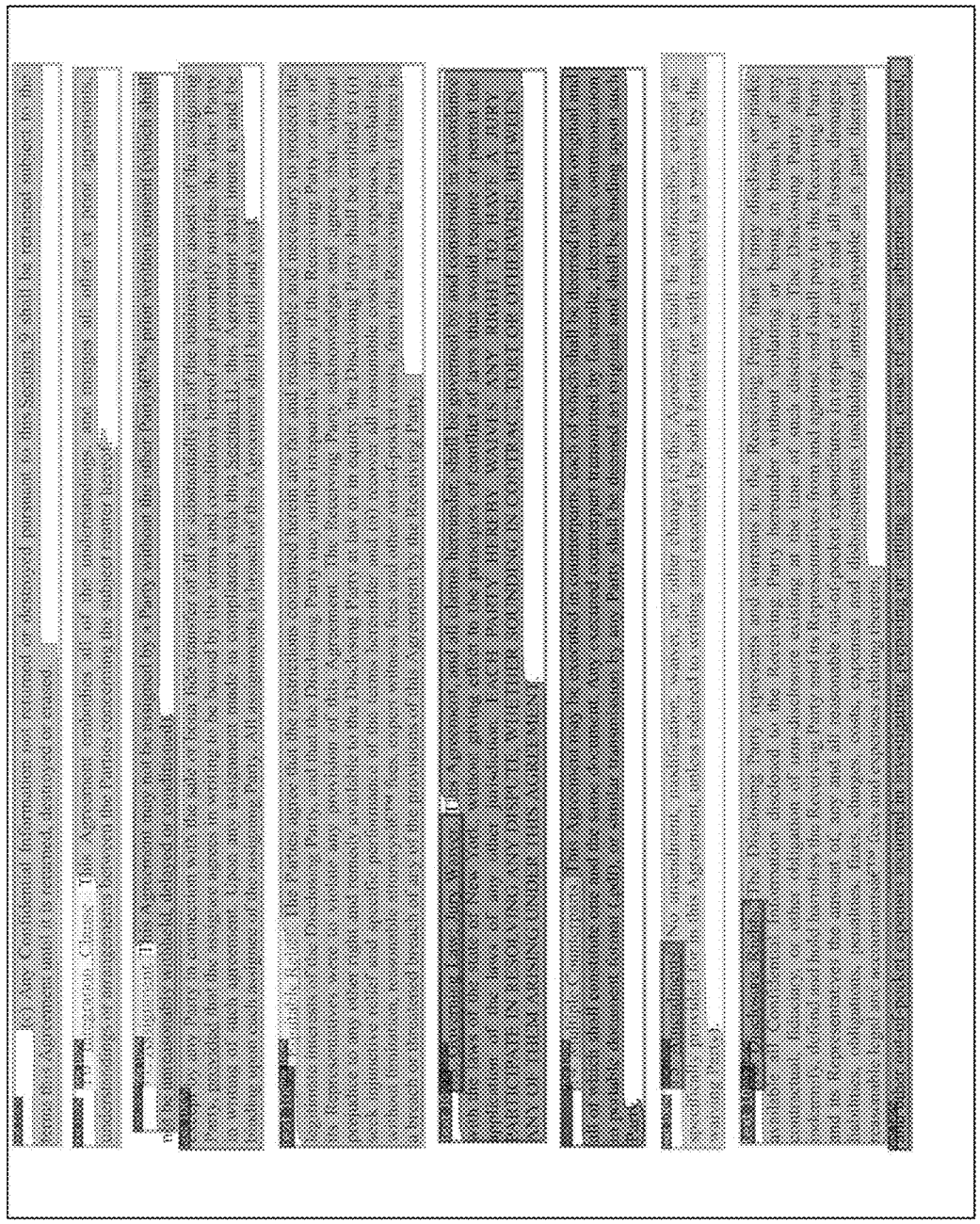
FIG. 11 illustrates a part of a document where some content blocks thereof overlap.

In different embodiments, a layout block may include a table, a title or a sub-title of a paragraph, a list, a drawing, a mathematical equation, a chemical formula, etc. It is noted that in some cases where the document file has some content blocks that overlap (as shown in FIG. 11), multiple layout blocks of the resulting document layout may also overlap. For example, when one paragraph includes a sub-title preceding the text content of the paragraph (e.g., the subtitle "11. The assignment"), the sub-title and the paragraph may be deemed as separate content blocks, and accordingly, separate layout blocks corresponding respectively to the sub-title and the paragraph may be included in the document layout.

The geometric property $g_j$ of the layout block $c_i$ may be expressed in the form of:

$$g_i: \left[\frac{x_i}{w}, \frac{y_i}{h}, \frac{w_i}{w}, \frac{h_i}{h}, \frac{A_i}{wh}\right]$$

where $(x_i, y_i)$ represents a geometrical centroid of the layout block $c_i$, $w_i$ represents a width of the layout block $c_i$, $h_i$ represents a height of the layout block $c_i$, and $A_i = \sqrt{w_i \times h_i}$.

A relation between any two layout blocks $c_1$ and $c_j$ may be expressed in the form of:

$$r_{i,j} = \left[\frac{\Delta x}{A_1}, \frac{\Delta y}{A_i}, \frac{w_j}{w_i}, \frac{h_j}{h_i}, \frac{1}{D}\sqrt{\Delta x^2 + \Delta y^2}\right]$$

where $(x_j, y_j)$ represents a geometrical centroid of the layout block $c_j$. $\Delta x = x_j - x_i$, $\Delta y = y_j - y_i$, $w_i$ represents a width of the layout block $c_i$, and $D = \sqrt{w^2 + h^2}$ such that the last item of the relation $r_{i,j}$ is a value normalized against a length of a diagonal of the document layout 700.

It is noted that, in some embodiments, the relation may further include relationships between the layout blocks, such as a relative distance, aspect ratios, a relative orientation and an intersection over union (IoU) between the layout blocks.

In some embodiments, the relative orientation between any two layout blocks $c_i$ and $c_j$ may be expressed in the form of:

$$\theta a \ \tan^{-1}\left(a\frac{\Delta y}{\Delta x}\right) \in [-\pi, \pi]$$

where $\theta$ represents the relative orientation between the layout blocks $c_i$ and $c_j$, and a is a constant.

In some embodiments, the IoU between any two layout blocks $c_i$ and $c_j$ may be expressed in the form of:

$$\psi_{ij} = \frac{(M(c_i) \cap M(c_j))}{(M(c_i) \cup M(c_j))}.$$

where $\psi_{ij}$ represents the IoU between the layout blocks $c_i$ and $c_j$, $M(c_i)$ indicates an area of the layout block $c_i$ on the document layout 700 and $M(c_j)$ indicates an area of the layout block $c_j$ on the document layout 700.

Using the above information, in step 210, the processor 302 generates, for each of the document files, a graph representation layout based on at least the document layout. The graph representation layout includes a plurality of nodes and a plurality of edges.

Figure 8:
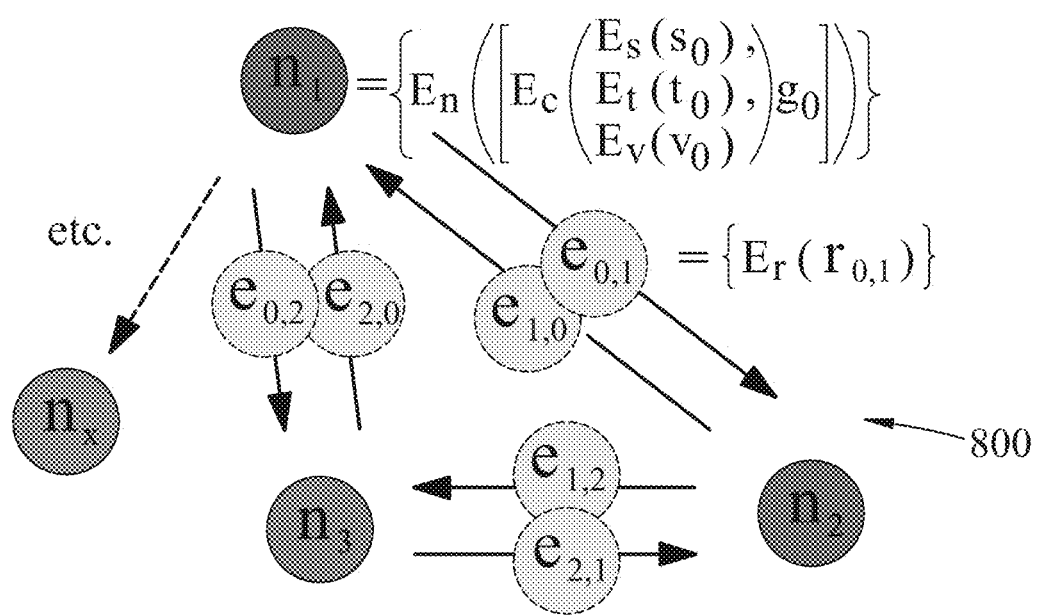
FIG. 8 is an exemplary graph representation layout that corresponds with the document layout as shown in FIG. 7.

FIG. 8 is an exemplary graph representation layout 800 that corresponds with the document layout as shown in FIG. 7.

In this example, the graph representation layout 800 includes three nodes $n_1$ to $n_3$, and a number of edges $e_{i,j}$ among the nodes $n_0$ to $n_2$.

It is noted that in this embodiment, the graph representation layout is generated by supplying the document layout 700 and various information obtained from the document files as an input into a graph encoder. In this embodiment, the graph encoder is implemented using a GNN, which is a multi-layer structure. Specifically, the graph encoder may include six layers that are arranged in the following order: a layout encoder layer, a graph convolutional network layer, a cross-graph convolutional network layer, a graph convolutional network layer, a match matrix prediction with Sinkhorn algorithm layer, and a permutation loss function layer (which is only present in the training of the graph encoder). The graph encoder may be further categorized into a node part and an edge part.

Figure 9:
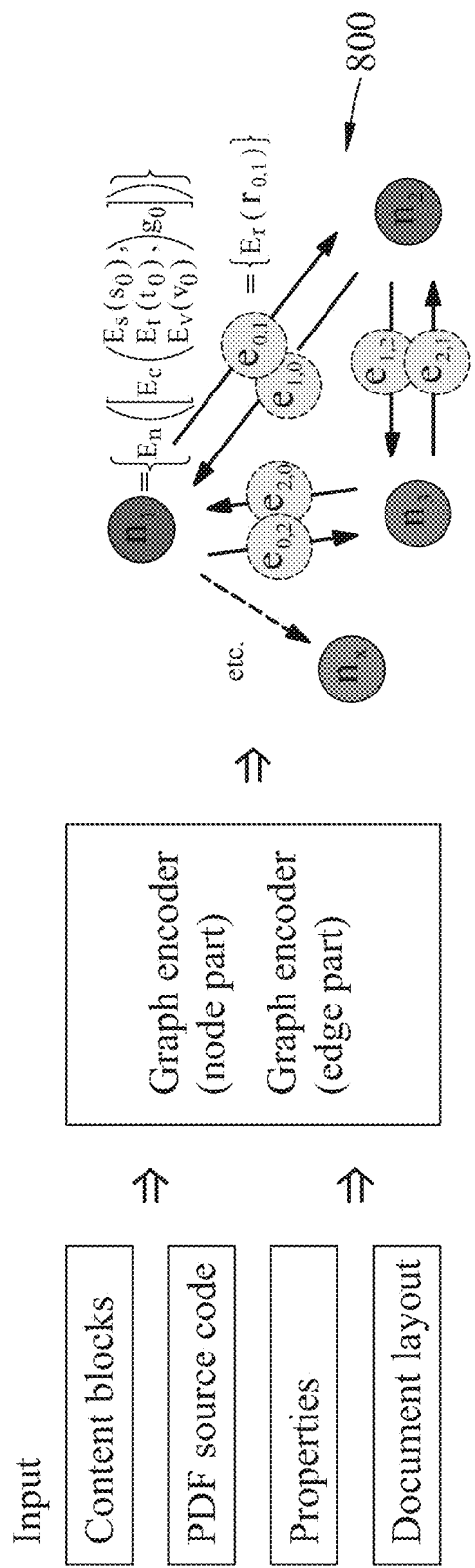
FIG. 9 illustrates relationships among the document layout, a graph encoder and the graph representation layout.

FIG. 9 illustrates input (i.e., the document files with the content blocks identified, the PDF source code, the properties and the document layout) and output (i.e., the graph representation layout) of the graph encoder.

The nodes $n_1$ to $n_3$ of the graph representation layout 800 are obtained by using the node part of the graph encoder to obtain associated information (i.e., the properties of the nodes) from the document layout 700, to process the information and then to project the processed information onto the graph representation layout 800 as the nodes. The edges of the graph representation layout 800 are obtained by using the edge part of the graph encoder to obtain associated information (i.e., the relations between the nodes) from the document layout 700, to process the information and then to project the processed information onto the graph representation layout 800 as the edges.

Afterward, in step 212, for each content block from one of the document files, the processor 302 compares the content block with each of the plurality of content blocks of the other one of the document files. Specifically, to compare one content block of one of the document files (target content block) with one content block of the other one of the document files (compared content block), the processor 302 compares the vectors of the properties of the target content block with the vectors of the properties of the compared content block, respectively.

Specifically, the operations of step 212 may be done using a graph matching process. In the graph matching process, the similarity between two graphs (i.e., the graph representation layouts indicating the two document files, respectively) are determined, and the similarity between two nodes respectively from the two graphs are also determined. Specifically, for each node of one of the graph representation layouts, the node is compared with each of the nodes of the other one of the graph representation layouts.

Figure 10:
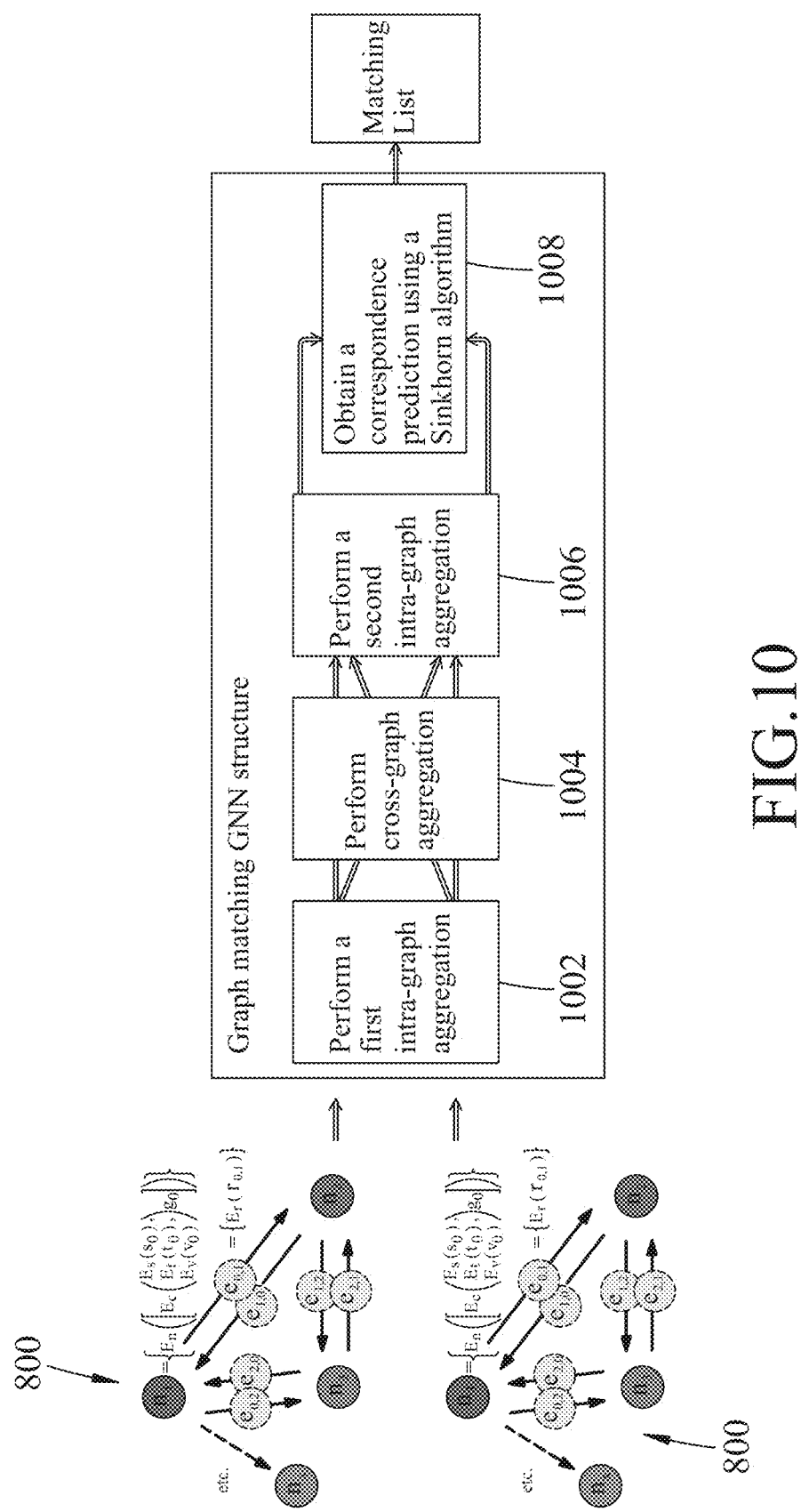
FIG. 10 is a flow chart illustrating the operations for comparing, for each content block from one of the document files, the properties of the content block with the properties of each content block of the other one of the document files.

FIG. 10 is a flow chart illustrating the operations of step 212. In this embodiment, the operations are performed by the processor 302 that executes a GNN structure, with the two graph representation layouts 800 and 800', which are generated in step 210, being supplied as an input.

In sub-step 1002, in response to the receipt of the graph representation layouts, a first intra-graph aggregation is performed on each graph representation layout to aggregate features from adjacent nodes in the graph representation layout.

In sub-step 1004, a cross-graph aggregation is performed to aggregate features from two nodes with similar features respectively from the two graph representation layouts. It is noted that, in the first iteration, an initialized matrix is generated for operation of the cross-graph aggregation. In one example, the initialized matrix is a zero matrix.

In sub-step 1006, a second intra-graph aggregation is performed on each of the graph representation layouts that has been processed in sub-steps 1002 and 1004.

In sub-step 1008, a correspondence prediction is obtained using a Sinkhorn algorithm to determine, for each content block from one of the two document files, a plurality of similarity coefficients respectively relative to the content blocks from the other one of the two document files. Specifically, for each content block from one of the two document files, one similarity coefficient indicates similarity between the content block and a corresponding one of the content blocks from the other one of the two document files.

It is noted that in some embodiments, the operations of sub-steps 1004, 1006 and 1008 are iterated multiple times before obtaining the correspondence prediction, so the correspondence prediction may be more accurate.

In step 214, the processor 302 generates a comparison result based on the operations of step 212.

In this embodiment, the comparison result includes a matching list between the document files. The matching list includes, for each of the content blocks included in one of the document files, at least one corresponding content block from the other one of the document files. Specifically, the matching list is determined based on the similarity coefficients obtained in the graph matching process. For example, for one content block in one of the document files (known as a reference block), a similarity coefficient with each of the content blocks in the other one of the document files is generated, and one or more of the content blocks in the other one of the document files that has the similarity coefficient with a highest value may be deemed as match with the reference block.

Afterward, the comparison result may be outputted in the form of the matching list, or in the form of a visual presentation as shown in FIGS. 12 and 13.

Specifically, each of FIGS. 12 and 13 fully or partially illustrates a comparison result of one pair of document files. The document files in each pair of document files may be slightly different from each other.

In the cases of FIG. 12, some texts are added or modified between two versions, while in the case of FIG. 13, additionally, more texts are changed or rewritten, some of the paragraphs are shifted to different positions, and completely unrelated paragraphs are present between the two versions.

For each version, a number of content blocks are defined, and after the comparison, the content blocks are numbered and represented using different colors, and the content blocks from the pair of document files that are deemed to correspond with each other may be represented in a same color or may be highlighted using a same style of background.

In brief, the method 200 as described above provides an approach to encode two document files into two graph representation layouts 800, respectively, in the form of spatial graph (geometric graph). Afterward, a graph matching process may be employed to compare the graph representation layouts 800, and to determine whether each of the content blocks in one of the documents corresponds with any one of content blocks in the other one of the documents. This method is particularly beneficial in comparing documents in portable document format.

According to one embodiment, there is provided a method for training a graph neural network (GNN) structure to compare content of two document files. In this embodiment, the GNN may be a graph convolutional network (GCN) or other similar networks.

Figure 14:
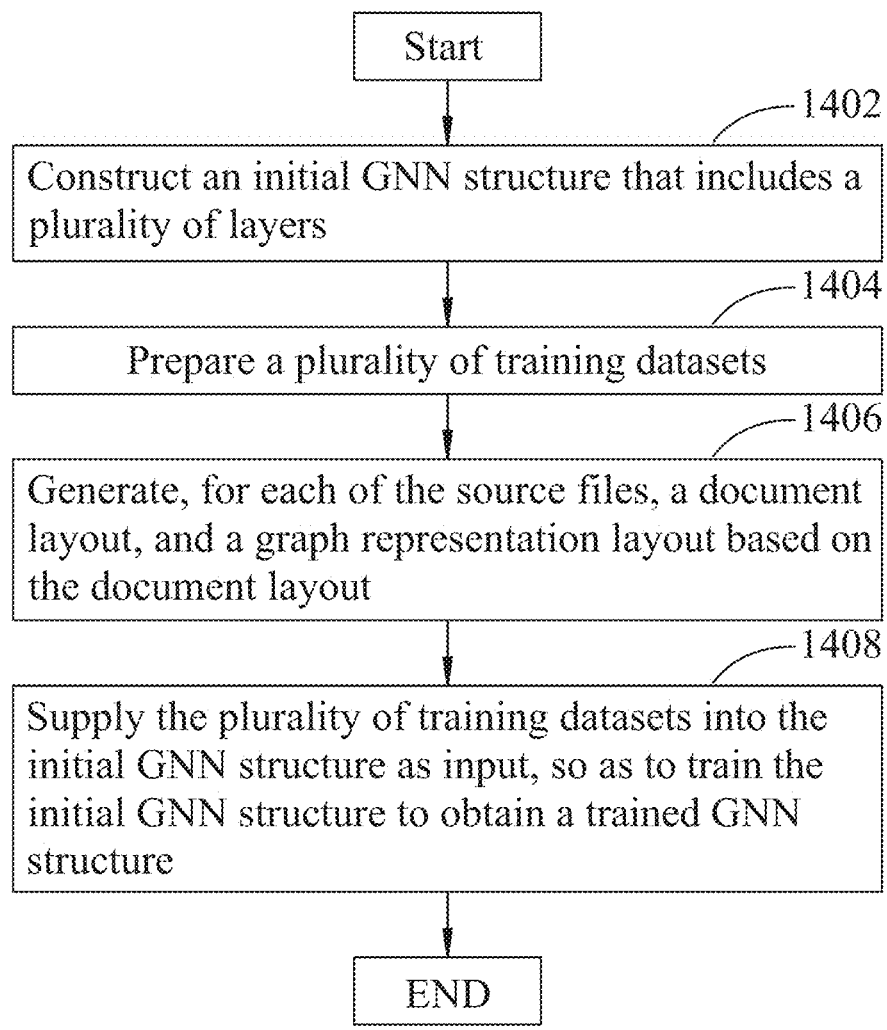
FIG. 14 is a flow chart illustrating steps of the method for training a graph neural network structure to compare content of two document files according to one embodiment of the disclosure.

FIG. 14 is a flow chart illustrating steps of a method 1400 for training a graph neural network (GNN) structure to compare content of two document files according to one embodiment of the disclosure. In this embodiment, the method may be implemented using the electronic device 100 as shown in FIG. 1, or may be implemented by an external device such as a cloud server.

In step 1402, the processor 302 constructs an initial GNN structure that includes a plurality of layers. In this embodiment, the initial GNN structure includes a first intra-GNN layer, a cross-GNN layer, a second intra-GNN layer, a Sinkhorn layer, and a permutation loss layer.

It is noted that the permutation loss layer is present in the training of the initial GNN structure, and is used for calculating a cross entropy between a predication and a ground truth. Since the use of the cross entropy is available in the related art, details thereof are omitted herein for the sake of brevity.

In step 1404, a plurality of training datasets are prepared and then the processor 302 obtains the training datasets. Each of the training datasets includes two source files. Each of the source files may be PDF or other commercially available document formats, and one of the source files may be an updated version of the other one of the source files (that is, said one of the source files includes some changes or revisions based on said the other one of the source files).

Figure 15:
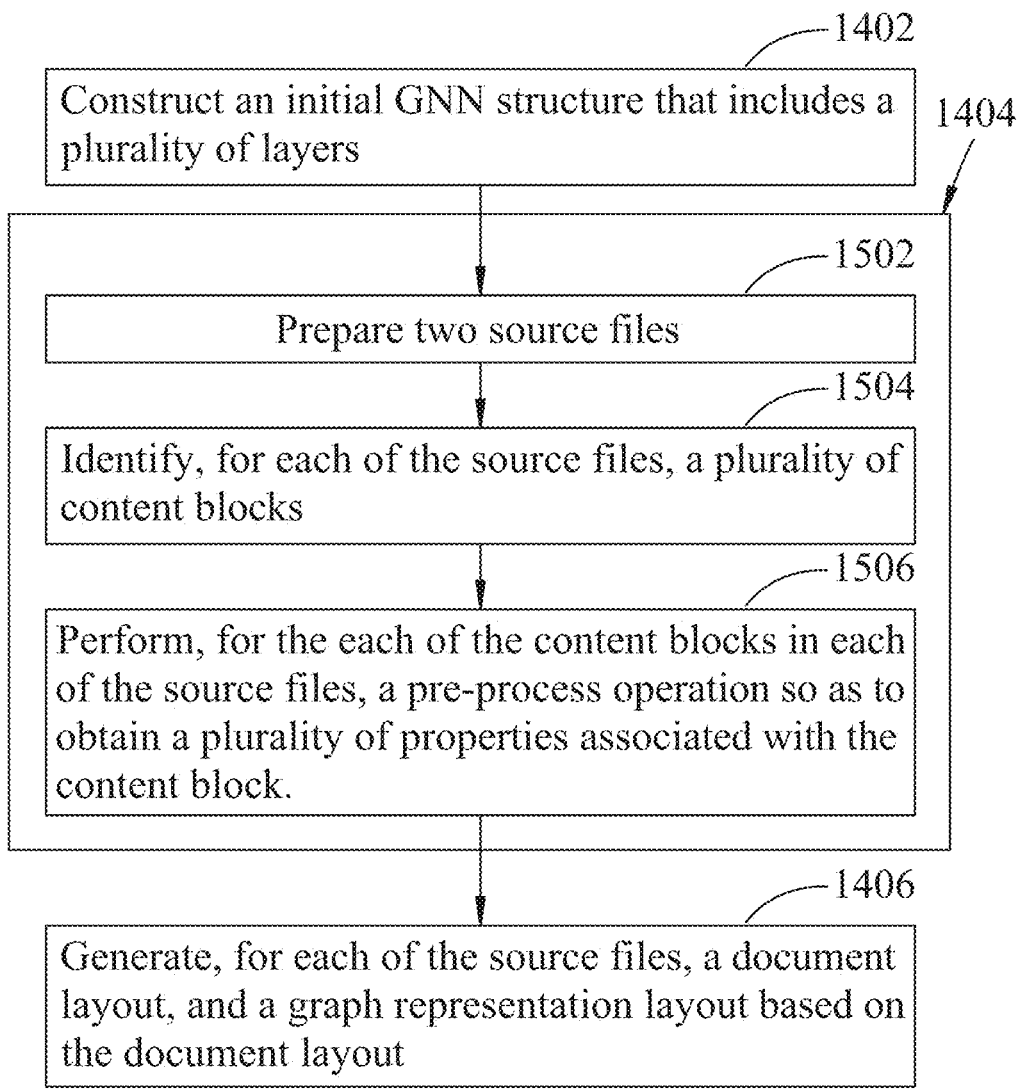
FIG. 15 is a flow chart illustrating sub-steps of a step of preparing a plurality of training datasets.

Specifically, the preparation of the training datasets included in step 1404 includes the following sub-steps, as shown in FIG. 15.

In sub-step 1502, the processor 302 obtains the two source files. The source files may be received from an external source such as a website or a cloud storage that can be accessed using the communication unit 304, or may be pre-stored in the storage medium 306.

In sub-step 1504, for each of the source files, a plurality of content blocks are identified. It is noted that the identification of the content blocks may be implemented in a manner similar to that as described in step 204. That is, the identification of the content blocks may be implemented by the processor 302 executing a pre-stored algorithm such as the ones as described in step 204, or may be manually implemented by a user.

In sub-step 1506, the processor 302 performs, for each of the content blocks in each of the source files, a pre-process operation so as to obtain a plurality of properties associated with the content block.

It is noted that in this embodiment, the pre-process operation may be implemented by the processor 302 in a manner similar to that as described in step 206.

For each of the content blocks, a plurality of properties associated with the content block include a text property indicating text content included in the content block, a geometric property indicating a location of the content block in the source file, and a visual property indicating the visual style of the text content included in the content block. In this embodiment, the two source files are in PDF, and the visual property of each of the content blocks is obtained from a set of PDF source codes contained in the corresponding source file. In other embodiments, additional properties may also be obtained.

After the pre-process operation is completed, in step 1406, the processor 302 generates, for each of the source files, a document layout, and generates, for each of the source files, a graph representation layout based on the document layout. The document layout includes a plurality of layout blocks each indicating a content block, and a plurality of layout associations each indicating a relationship between two layout blocks. The graph representation layout includes a number of nodes and a plurality of edges.

A manner in which the document layouts and the graph representation layout are generated may be similar of those as described in steps 208 and 210, and shown in FIGS. 7 to 9, and details thereof are omitted herein for the sake of brevity.

In step 1408, the processor 302 supplies the plurality of training datasets into the initial GNN structure as input, so as to train the initial GNN structure to obtain a trained GNN structure. It is noted that the above operations may be repeated multiple times, until an output of the trained GNN structure is deemed to be good enough (done by the ways of a manual verification or an automatic neural network verification that is commercially available).

The trained GNN structure is then capable of performing the graph matching process as described in step 212 and shown in FIG. 10.

Specifically, in response to receipt of two graph representation layout of two document files, the trained GNN structure is configured to: perform a first intra-graph aggregation to aggregate features from adjacent nodes; perform a cross-graph aggregation to aggregate features from nodes with similar features from the two graph representation layouts; perform a second intra-graph aggregation; and obtain a correspondence prediction using a Sinkhorn algorithm to determine a similarity coefficient between two content blocks from the two document files. In some embodiments, the cross-graph aggregation, the second intra-graph aggregation and the obtaining of a correspondence prediction are iterated multiple times.

The trained GNN structure may then be used to perform the operations as described in the previous embodiments.

To sum up, embodiments of the disclosure provide a method for comparing content of two document files. Specifically, the method is configured to output a comparison result between content blocks of the two document files. In the method, the two document files are first transformed into two graph representation layouts, respectively, and a graph matching process is performed so as to generate a comparison result based on comparisons among content blocks of one of the two document files and content blocks of the other one of the two document files.

In this manner, the text, visual and geometrical properties of the document files can all be included for the comparison, allowing a more extensive comparison. Moreover, using the method of the disclosure, a matching list between the content blocks of one of the document files and the content blocks of the other one of the document files may be obtained even in the case that the content blocks are moved (in terms of page layout), split, or merged, or span multiple pages, etc. This also enables a detailed comparison between the document files to be implemented subsequently, with more efficiency.

Additionally, by using the graph representation layouts (which may be spatial graphs) to represent the document files and using the graph matching process for comparison, more complex relationships between the document files may be detected.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for comparing content of two document files each having a plurality of content blocks, the method to be implemented by an electronic device and comprising the steps of:
    a) performing, for each of the content blocks in each of the document files, a pre-process operation so as to obtain a plurality of properties associated with the content block;
    b) comparing, for each content block from one of the document files, the properties of the content block with the properties of each of the plurality of content blocks of the other one of the document files;
    c) generating a comparison result based on the operations of step b);
    d) receiving the two document files; and
    e) in response to receipt of the two document files, identifying, for each of the document files, the plurality of content blocks.

2. The method of claim 1, wherein the comparison result includes a matching list between the document files, the matching list including, for each of the content blocks included in one of the document files, at least one corresponding content block from the other one of the document files.

3. The method of claim 1, wherein in step a), the plurality of properties of each of the content blocks include:
    a text property indicating text content included in the content block;
    a geometric property indicating a location of the content block in the document file; and
    a visual property indicating a visual style of the text content included in the content block.

4. The method of claim 3, each of the two document files being in a portable document format (PDF), wherein the visual property of each of the content blocks is obtained from a set of PDF source codes contained in the document file.

5. The method of claim 1, further comprising, between steps a) and b):
    generating, for each of the document files, a document layout that includes
        a plurality of layout blocks each indicating a content block; and
        a plurality of layout associations each indicating a relationship between two layout blocks; and
    generating, for each of the document files, a graph representation layout based on the document layout, the graph representation layout including a number of nodes and a plurality of edges.

6. The method of claim 5, wherein the graph representation layout is generated by supplying the document layout as an input into a graph encoder algorithm, the graph encoder algorithm being implemented using a first graph neural network (GNN) structure.

7. The method of claim 6, wherein step b) includes supplying the graph representation layouts respectively from the document files as an input to a second graph neural network (GNN) structure to perform a graph matching process.

8. The method of claim 7, wherein the graph matching process includes, in response to the receipt of the graph representation layouts:
    performing a first intra-graph aggregation on each of the graph representation layouts to aggregate features from adjacent nodes in the graph representation layout;
    generating an initialized matrix;
    performing a cross-graph aggregation with the initialized matrix to aggregate features from two nodes with similar features respectively from the graph representation layouts;
    performing a second intra-graph aggregation on each of the graph representation layouts that has been processed by the first intra-graph aggregation and the cross-graph aggregation; and
    obtaining a correspondence prediction using a Sinkhorn algorithm to determine, for each of the content blocks from one of the document files, a plurality of similarity coefficients respectively relative to the content blocks from the other one of the document files.

9. The method of claim 8, wherein the cross-graph aggregation, the second intra-graph aggregation and the obtaining of a correspondence prediction are iterated multiple times.

10. The method of claim 8, wherein:
    the comparison result includes a matching list between the document files, the matching list including, for each of the content blocks included in one of the document files, at least one corresponding content block from the other one of the document files; and
    the matching list is determined based on the similarity coefficients obtained in the graph matching process.

11. A method for training a graph neural network (GNN) structure to compare content of two document files, the method comprising:
    constructing an initial GNN structure that includes a plurality of layers;
    preparing a plurality of training datasets, each of the training datasets including two source files, each of the source files including a plurality of content blocks;
    supplying the plurality of training datasets into the initial GNN structure as input, so as to train the initial GNN structure to obtain a trained GNN structure that is configured to compare, for each content block from one of the document files, properties of the content block with the properties of each of a plurality of content blocks of the other one of the document files.

12. The method of claim 11, wherein the initial GNN structure includes a first intra-GNN layer, a cross-GNN layer, a second intra-GNN layer, a Sinkhorn layer, and a permutation loss layer.

13. The method of claim 11, wherein the preparing of a plurality of training datasets includes:
    preparing two source files;
    identifying, for each of the source files, a plurality of content blocks; and performing, using a computer device for each of the content blocks in each of the source files, a pre-process operation so as to obtain a plurality of properties associated with the content block.

14. The method of claim 13, wherein the plurality of properties associated with each of the content blocks include:
   a text property indicating text content included in the content block;
   a geometric property indicating a location of the content block in the source file; and
   a visual property indicating the visual style of the text content included in the content block.

15. The method of claim 13, the two source files each being in a portable document format (PDF), wherein the visual property of each of the content blocks is obtained from a set of PDF source code contained in the corresponding one of the source files.

16. The method of claim 13, wherein the preparing of a plurality of training datasets includes:
   generating, for each of the source files, a document layout that includes
      a plurality of layout blocks each indicating a content block; and
      a plurality of layout associations each indicating a relationship between two layout blocks; and
   generating, for each of the source files, a graph representation layout based on the document layout, the graph representation layout including a number of nodes and a plurality of edges.

17. The method of claim 16, wherein the trained GNN structure is capable of performing a graph matching process that includes, in response to receipt of graph representation layouts of the two document files:
   performing a first intra-graph aggregation to aggregate features from adjacent nodes;
   generating an initialized matrix;
   performing a cross-graph aggregation with the initialized matrix to aggregate features from nodes with similar features from the graph representation layouts;
   performing a second intra-graph aggregation on each of the graph representation layouts that has been processed by the first intra-graph aggregation and the cross-graph aggregation; and
   obtaining a correspondence prediction using a Sinkhorn algorithm to determine, for each of the content blocks from one of the document files, a plurality of similarity coefficients respectively relative to the content blocks from the other one of the document files.

18. The method of claim 17, wherein the cross-graph aggregation, the second intra-graph aggregation and the obtaining of a correspondence prediction are iterated multiple times.

* * * * *